United States Patent

[11] 3,542,450

[72] Inventor: Wallace I. Terhune
  Rye, New York
[21] Appl. No.: 799,068
[22] Filed: Feb. 13, 1969
[45] Patented: Nov. 24, 1970
[73] Assignee: Richards Manufacturing Company
  Memphis, Tennessee
  a corporation of Delaware

[54] HEAT BAFFLE ASSEMBLY FOR ENVELOPE-COVERED OPERATING MICROSCOPE
  5 Claims, 6 Drawing Figs.
[52] U.S. Cl. ..................................... 350/65
[51] Int. Cl. ..................................... G02b,
  G03b 11/04
[50] Field of Search .......................... 350/61–
  –67; 15/checked; 339/checked; 95/checked;
  250/49.54

[56] References Cited
  UNITED STATES PATENTS
  2,267,137  12/1941  Ruska et al. ............. 250/49.5
  2,599,689   6/1952  Brelsford ................. 350/65X
  3,382,781   5/1968  Hamilton ................ 350/610X Primary Examiner—Paul R. Gilliam
Attorney—John R. Walker, III ABSTRACT: A heat baffle assembly adapted to be secured on the head assembly of operating microscope apparatus and adapted to be used in conjunction with sheet plastic envelope cover means covering the microscope apparatus. The heat baffle assembly is a U-shaped strip of sheet metal material, and including a pair of hornlike projections and tension spring means adapted to detachably mount the baffle assembly on the camera attachment and objective housing structure of the microscope apparatus. The primary function of the baffle device is to prevent the thin sheet plastic envelope cover means from engaging the lamp housing or other lamp-heated parts of the microscope, and to prevent damage to the plastic microscope envelope by engagement with the heated parts of the microscope apparatus.

Patented Nov. 24, 1970
3,542,450
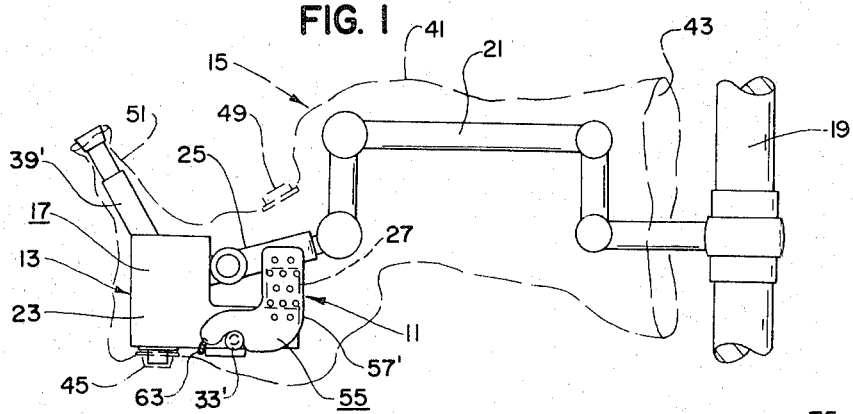
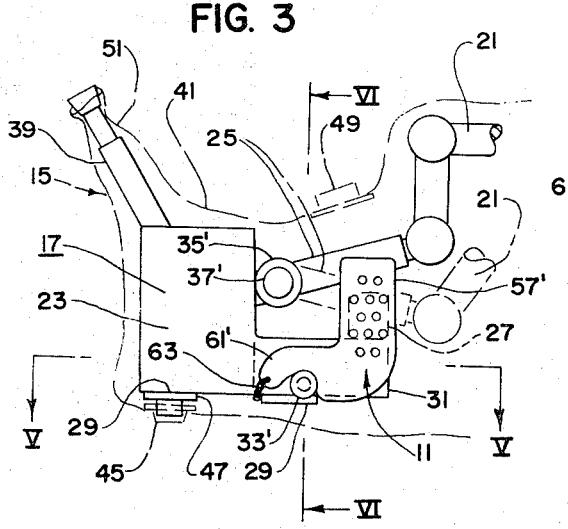
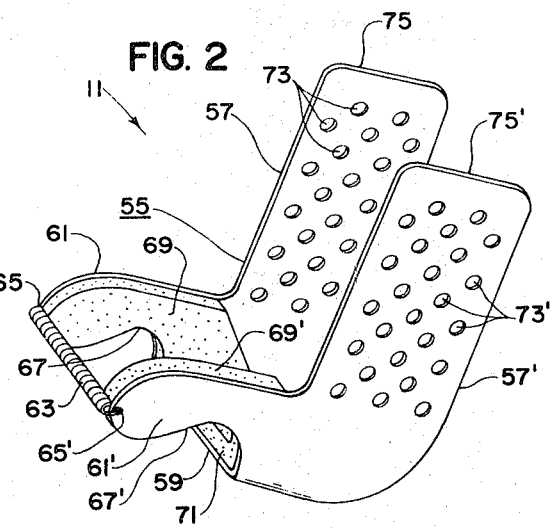
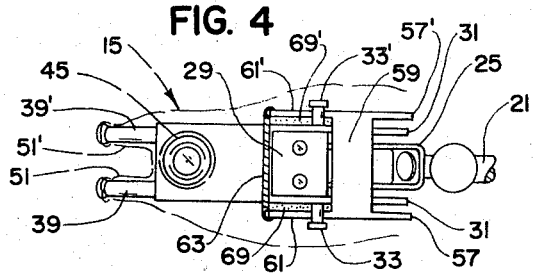
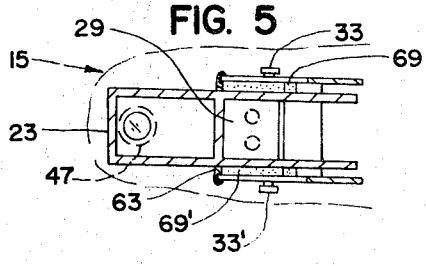
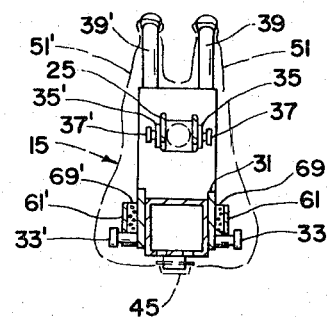
INVENTOR.
WALLACE I. TERHUNE
BY John R. Walker, III
attorney

HEAT BAFFLE ASSEMBLY FOR ENVELOPE-COVERED OPERATING MICROSCOPE

CROSS REFERENCE TO RELATED APPLICATION

The heat baffle assembly disclosed in this application is adapted to be used in conjunction with the microscope envelope cover means disclosed in a copending application entitled "Operating Microscope Envelope Means" and assigned to the same assignee as the assignee of this invention.

BACKGROUND OF THE INVENTION

1. Field of the Invention

The invention relates generally to instrument covers and to sterile envelope-type covers adapted to cover operating microscope apparatus. The invention particularly relates to a heat baffle assembly adapted to be used in conjunction with sheet plastic envelope-type microscope cover for preventing damage to the cover from heat generated by the illuminating means of the microscope objective section.

2. Description of the Prior Art

In utilizing thin plastic sheet or film material for covering an operating microscope, a considerable problem is experienced in properly protecting the thin plastic sheet material from heat generated by the illuminating lamp housing structure of the microscope. The microscope envelope cover being preferably formed of sheet plastic polyethylene material is not heat resistant and is rather easily melted or damaged by contact with heated lamp parts of the microscope apparatus. In order to eliminate such heat damage to a microscope cover as abovementioned, it has been suggested to form the envelope cover of a sheet material having heat resistant qualities and to form the operating microscope envelope of material which would substantially be unaffected by heated parts of the microscope or heat generated by such microscope parts. Although sheet material having heat resistant qualities is commercially available and perhaps would be usable for fabricating the microscope envelope cover structure, such heat resistant material is rather costly and also does not exhibit certain desirable characteristics which are exhibited by the thin, clear polyethylene sheet material. Generally, such heat resistant material is rather heavy and is not as flexible as the polyethylene plastic material and exhibits other features which are undesirable for its use in enveloping or covering operating microscope structure.

SUMMARY OF THE INVENTION

The heat baffle assembly of the present invention may readily be installed on or removed from an operating microscope for preventing heat damage to a sheet plastic microscope cover. The heat baffle assembly is generally U-shaped and is adapted to be supported from the objective section housing of the microscope in such a manner as to properly guard the microscope plastic cover from heated parts or heat generated by the microscope lamp, while yet permitting free translational or pivotal adjustment of the microscope objective section. The use of the heat baffle assembly of the invention affords means whereby the microscope envelope structure may be economically formed of readily available polyethylene sheet material or other like material, so that a disposable drape or microscope cover means is feasible. Utilizing the heat baffle assembly of the present invention affords means whereby the microscope cover envelope may be formed of sheet plastic material having desired flexibility over a substantially wide range of temperature conditions. The heat baffle structure of this invention complements the envelope structure of the above-mentioned copending application entitled "Operating Microscope Envelope Means." The use of the heat baffle structure of the invention affords means whereby the microscope envelope may be economically fabricated and fabricated of such sheet plastic material exhibiting the above-mentioned desirable characteristics.

BRIEF DESCRIPTION OF THE DRAWING

FIG. 1 is an environmental showing of the heat baffle assembly of the invention shown mounted on the head assembly of an operating microscope and with the microscope being enveloped by sheet plastic microscope envelope structure (the microscope envelope structure being shown in broken lines).

FIG. 2 is a perspective view of the heat baffle assembly at a disposition removed from the microscope apparatus.

FIG. 3 is a side elevational view of the heat baffle assembly shown mounted on an operating microscope and with the microscope envelope means being shown in broken lines.

FIG. 4 is a bottom view of the heat baffle structure of the invention shown mounted on an operating microscope, and is a view as viewed upwardly of FIG. 3.

FIG. 5 is a horizontal plane sectional view taken as on the line V-V of FIG. 3.

FIG. 6 is a vertical plane sectional view taken as on the line VI-VI of FIG. 3.

DESCRIPTION OF THE PREFERRED EMBODIMENT

The heat baffle assembly of the invention is indicated by numeral 11 and is illustrated in conjunction with operating microscope apparatus 13 and sheet plastic envelope means 15 enveloping microscope apparatus 13.

Microscope apparatus 13 typically includes a microscope head assembly 17 supported from stationary column structure 19 by an articulated arm assembly 21 (see FIG. 1). The microscope head assembly typically includes an objective section 23 cantilever supported from the proximal end of articulated arm assembly 21 by support yoke structure 25 lengthwise fitted around typical microscope lamp housing structure 27. Microscope head assembly 17 typically includes camera attachment structure 29, supported on housing portion 31 projecting right angularly from the lower rearward portion of objective section 23. A pair of light filter knobs including left and right filter knobs 33, 33' projecting laterally oppositely from camera attachment structure 29 typically provide blue and green light filter means for the illumination going to objective section 23 of the microscope apparatus. Adjustment knobs 35, 35'; 37, 37' arranged oppositely laterally of objective section 23 provide adjustment means respectively for pivotally fixing objective section 23 relative to yoke assembly 25 and for translational adjustment of the objective section. The microscope apparatus typically includes binocular left and right eyepiece projections 39, 39' projecting upwardly in typical fashion from microscope objective section 23.

Sheet plastic envelope structure 15 is defined in the above mentioned copending application entitled "Operating Microscope Envelope Means." Sheet plastic envelope means 15 is generally sacklike and is adapted to be telescopically fitted over microscope apparatus (see FIG. 1). Microscope envelope 15 includes a sacklike body 41, having an end opening 43, adapted to be arranged around the articulated arm assembly 21 of the microscope support structure. Microscope envelope 15 includes objective ring structure 45 fitted in the lower forward portion of envelope body 41 and such structure adapted to frictionally fit about the objective lens frame 47 of telescope objective section 23. An exhaust port grommet 49 also is fitted in the upper intermediate portion of envelope body 41 for exhausting heated air from the interior of envelope 15 and such air heated by the lamp housing and illuminating lamp means of the microscope. Envelope structure 15 also includes a pair of eyepiece projections 51, 51' adapted to fit socklike respectively around the microscope eyepiece projections 39, 39' of microscope objective section 23.

Heat baffle assembly 11 includes a body 55 generally U-shaped in configuration and preferably formed of a single piece of sheet aluminum material. Heat baffle body 55 preferably includes left and right blade or baffle portions 57, 57', each being generally flat and vertically elongated in form and flatwise confrontingly arranged. Heat baffle body 55 also includes a bight portion 59 firmly interconnecting the lower end portions respectively of left and right blade portions 57, 57' and includes left and right horn projections 61, 61' projecting forwardly respectively from right and left blade portions 57, 57' (see FIG. 2).

Baffle assembly 11 is adapted to be removably fitted on microscope head assembly 17 with left and right baffle blade portions 57, 57' projecting respectively upwardly and spanning yoke assembly 25. Baffle assembly 11 is adapted to be firmly fitted on housing portion 31 of the microscope head assembly with left and right horn projections 61, 61' being somewhat hooked over respective light filter knobs 33, 33' and with heat baffle bight portion 59 being upwardly urged against the undersurface of housing portion 31.

Heat baffle assembly 11 preferably includes a helical tension spring 63 bridgingly tensioned across the distal end portions respectively of left and right horn projections 61, 61' and having opposite end portions anchored respectively in aperture structure 65, 65' of horn projections 61, 61'. Baffle assembly 11 is adapted to be detachably attached to the microscope head assembly with tension spring 63 being arranged around the forward underportion of camera attachment structure 29; in securing heat baffle assembly 11 on housing portion 31, helical spring 63 fulcrums left and right horn projections 61, 61' respectively across light filter knobs with arcuate underedge structure 67, 67' respectively of left and right horn projections 61, 61' being fulcrumed respectively over light filter knobs 33, 33'.

Heat baffle assembly 11 preferably includes heat insulating means secured on the inwardly disposed surface portions respectively of left and right horn projections 61, 61' and bight portion 59 for heat insulating the baffle assembly from the lamp housing and yoke parts of the microscope head assembly. The heat insulating means preferably is in the form of thick foam plastic material 69, 69', 71 adhesively secured on the inside surfaces respectively of left and right horn portions 61, 61' and bight portion 59 of heat baffle body 55. Foam plastic insulating structures 69, 69', 71 is adapted to snugly engage the rearward portion respectively of housing portion 31 of the microscope head assembly and serves as insulator means between the heated housing portion 31 and baffle body 55. A multiplicity of apertures 73, 73' preferably is formed respectively in upstanding left and right blade portions 57, 57' of baffle body 55; apertures 73, 73' provide means for diffusion or circulation of the heated air through baffle body 58 and within the interior of envelope structure 15.

By manipulation of adjustment knobs 35, 35'; 37, 37' the objective section of the microscope may be pivoted or translationally moved relative to pivotable yoke assembly 25 (FIG. 3 illustrates, in broken lines, the relative pivotal movement of yoke assembly 25 relative to objective section 23 of the microscope). Left and right blade portions 57, 57' respectively of baffle body 55 are adapted to be arranged closely adjacent respective opposite side surfaces of yoke assembly 25 while yet permitting free pivotal or translational movement of the baffle body relative to the yoke assembly. The upper edge portions 75, 75' respectively of left and right blade portions 57, 57' of baffle body 55 are adapted to engage the interior upper intermediate portion of envelope body 41 and to elevatingly support the envelope body over microscope head assembly 17. In fitting plastic envelope 15 over microscope apparatus 13, exhaust port grommet 49 preferably is supported superjacently on or above the upper edge structure 75, 75' of baffle body blade portions 57, 57'. Exhaust port grommet 49 preferably is positioned generally symmetrically of heat baffle assembly 11 an serves as chimney means for exhausting the heated air from the interior of envelope body 41.

I claim:

1. A heat baffle assembly adapted to be used with operating microscope apparatus including a microscope head assembly, articulated arm structure supporting said head assembly, and sheet plastic envelope means enveloping said microscope apparatus, said microscope head assembly having an objective section having an objective housing, having a lamp housing fixedly supported on said objective housing, having a pair of oppositely laterally projecting knobs, and having yoke means adjustably interconnecting said objective section housing and the distal end portion of said articulated arm structure, said heat baffle assembly including a left blade and a right blade substantially parallel with said left blade, each blade being substantially flat and vertically elongated in form, a bight portion firmly interconnecting the lower end portions respectively of said left and right baffle blades, left and right parallel arranged horn projections firmly secured respectively on the lower end portions of said left and right baffle blades and holding means between the distal end portions respectively of said left and right horn projections; said baffle assembly being adapted to be removably fitted on the microscope head assembly with said left and right baffle blades being on opposite sides of said yoke means, with the intermediate portions respectively of said left and right horn projections engaging said knobs, and with said holding means being arranged around said microscope apparatus.

2. The heat baffle assembly as defined in claim 1 which additionally includes insulating means secured on the inwardly disposed surface portions respectively of said left and right horn projections and said bight portion of said baffle assembly for heat insulating said baffle assembly from the lamp housing yoke means of the microscope head assembly.

3. The heat baffle assembly as defined in claim 2 wherein said heat insulating means is formed of foam plastic material secured on the inwardly disposed surface portions respectively of said left and right horn projections and said bight portion of said baffle assembly.

4. The heat baffle assembly as defined in claim 1 wherein said holding means between the distal end portions of said left and right horn projections is in the form of a helical tension spring member having opposite end portions thereof secured respectively in aperture structure formed respectively on the distal end portions of said left and right horn projections.

5. The heat baffle assembly of claim 1 wherein said left and right baffle blades, said bight portion, and said left and right horn projections are unitarily formed of a single piece of sheet metal material.